US010977454B2

(12) United States Patent
Kataoka et al.

(10) Patent No.: US 10,977,454 B2
(45) Date of Patent: Apr. 13, 2021

(54) SENSOR MANAGEMENT DEVICE, SENSOR INFORMATION SYNCHRONIZATION METHOD, AND NON-TRANSITORY COMPUTER READABLE RECORDING MEDIUM

(71) Applicant: OMRON Corporation, Kyoto (JP)

(72) Inventors: Arata Kataoka, Kyoto (JP); Yahiro Koezuka, Kyoto (JP); Hidekatsu Nogami, Kyoto (JP); Yoshimitsu Nakano, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/274,240

(22) Filed: Feb. 13, 2019

(65) Prior Publication Data

US 2019/0286857 A1    Sep. 19, 2019

(30) Foreign Application Priority Data

Mar. 14, 2018  (JP) .............................. JP2018-047195

(51) Int. Cl.
*G08B 1/08* (2006.01)
*G06K 7/10* (2006.01)
*H04Q 9/00* (2006.01)

(52) U.S. Cl.
CPC ..... *G06K 7/10039* (2013.01); *G06K 7/10198* (2013.01); *G06K 7/10297* (2013.01); *H04Q 9/00* (2013.01)

(58) Field of Classification Search
CPC ........... G06K 7/10039; G06K 7/10198; G06K 7/10297; H04Q 9/00
See application file for complete search history.

(56) References Cited

U.S. PATENT DOCUMENTS 5,856,788 A * 1/1999 Walter ................. G06K 7/0008
340/10.2
5,940,006 A * 8/1999 MacLellan ............ G01S 13/825
235/375

(Continued)

FOREIGN PATENT DOCUMENTS

| CN | 106452650 | 2/2017 |
| JP | 2004535586 | 11/2004 |
| JP | 2014178952 | 9/2014 |

OTHER PUBLICATIONS

Ando et al., A Time Alignment Method for Multiple Sensing Systems with GNSS Timing and IMUs with Frame-Sync Input (Year: 2020).*

(Continued)

*Primary Examiner* — Quang Pham
(74) *Attorney, Agent, or Firm* — JCIPRNET

(57) ABSTRACT

Provided is a technology that enables a plurality of sensor information to be synchronized for a technology of a sensor management device communicating with a plurality of wireless sensors in a time division manner. A sensor management device includes a transmission unit that transmits acquisition start instructions for starting acquisitions of sensor information to a plurality of wireless sensors respectively at different timings; and an extraction unit that extracts a plurality of common period sensor information that the plurality of wireless sensors have acquired in the common period from the plurality of sensor information with reference to deviation of times at which the transmission unit has transmitted the acquisition start instructions to the plurality of wireless sensors.

10 Claims, 10 Drawing Sheets

(56) References Cited

U.S. PATENT DOCUMENTS

| | | | | |
|---|---|---|---|---|
| 8,050,881 B1* | 11/2011 | Yeung | A61B 5/0024 | 702/89 |
| 2005/0207391 A1* | 9/2005 | Friedrich | G06K 7/0008 | 370/349 |
| 2005/0212661 A1* | 9/2005 | Friedrich | G06K 7/0008 | 340/10.5 |
| 2005/0212693 A1* | 9/2005 | Friedrich | H04L 69/24 | 342/42 |
| 2009/0185505 A1* | 7/2009 | Ripstein | G06K 7/10039 | 370/254 |
| 2010/0085190 A1* | 4/2010 | Sueoka | H04Q 9/00 | 340/572.7 |
| 2011/0001612 A1* | 1/2011 | Chung | G08B 25/10 | 340/286.02 |
| 2011/0234380 A1* | 9/2011 | Ito | G06K 19/0724 | 340/10.2 |
| 2011/0248834 A1* | 10/2011 | Warner | H04Q 9/00 | 340/10.34 |
| 2011/0264241 A1* | 10/2011 | Pettigrew | G05B 19/0423 | 700/14 |
| 2014/0125497 A1* | 5/2014 | Uchiyama | G01D 21/00 | 340/870.16 |
| 2015/0116127 A1* | 4/2015 | Lynch | H04W 52/028 | 340/870.02 |
| 2015/0192907 A1* | 7/2015 | Blevins | G05B 17/02 | 700/11 |
| 2015/0358933 A1* | 12/2015 | Yamamoto | H04W 4/70 | 370/329 |
| 2016/0105618 A1* | 4/2016 | Shimauchi | H04N 5/247 | 386/210 |
| 2017/0034401 A1* | 2/2017 | Shiohara | G09G 3/2096 | |
| 2017/0041897 A1* | 2/2017 | Pitigoi-Aron | G06F 1/14 | |
| 2017/0180087 A1* | 6/2017 | Bang | H04L 5/0053 | |
| 2017/0302248 A1* | 10/2017 | Feng | H03H 9/145 | |
| 2018/0107850 A1* | 4/2018 | Ro L | G06K 7/10039 | |
| 2018/0167299 A1* | 6/2018 | Karlsson | H04L 41/0836 | |
| 2018/0172664 A1* | 6/2018 | Love | H04W 12/50 | |
| 2018/0197628 A1* | 7/2018 | Wei | A61B 5/14532 | |
| 2019/0005807 A1* | 1/2019 | Fujimori | G08C 15/06 | |
| 2019/0041235 A1* | 2/2019 | Ko | G01D 5/00 | |
| 2019/0279498 A1* | 9/2019 | Honda | G08C 15/06 | |
| 2020/0153527 A1* | 5/2020 | Matsunaga | H04J 3/0673 | |
| 2020/0244922 A1* | 7/2020 | Mitsubayashi | H04N 5/247 | |
| 2020/0304967 A1* | 9/2020 | Kuriyama | H04Q 9/00 | |
| 2020/0322761 A1* | 10/2020 | Yamamoto | H04L 67/32 | |

OTHER PUBLICATIONS

Huan et al., Optimal Message Bundling with Delay and Synchronization Constraints in Wireless Sensor Networks (Year: 2019).*

Rusydi et al., Real-time measurement of grid connected solar panels based on wireless sensors network (Year: 2016).*

Yuan et al., Synchronization of Multiple Levels of Data Fusion in Wireless Sensor Networks (Year: 2003).*

"Search Report of Europe Counterpart Application", dated Aug. 14, 2019, pp. 1-8.

"Office Action of China Counterpart Application", dated Dec. 3, 2020, with English translation thereof, p. 1-p. 13.

* cited by examiner

SENSOR MANAGEMENT DEVICE, SENSOR INFORMATION SYNCHRONIZATION METHOD, AND NON-TRANSITORY COMPUTER READABLE RECORDING MEDIUM

CROSS REFERENCE TO RELATED APPLICATIONS

This application claims the priority benefit of Japanese Patent Application No. 2018-047195, filed on Mar. 14, 2018. The entirety of the above-mentioned patent application is hereby incorporated by reference herein and made a part of this specification.

BACKGROUND

Technical Field

The present disclosure mainly relates to a sensor management device that receives a plurality of sensor information from a plurality of wireless sensors that each acquire the sensor information.

Description of Related Art

A technology in which a sensor management device (for example, a reader/writer) communicates with a plurality of wireless sensors (for example, RFID tags) in a time division manner is known. According to the technology, the sensor management device receives a plurality of sensor information from the plurality of wireless sensors that each acquire the sensor information in a time division manner.

As literatures describing the above technology of receiving a plurality of sensor information from a plurality of sensors, Patent Document 1 (Japanese Laid-Open Application No. 2014-178952, published on Sep. 25, 2014) and Patent Document 2 (Japanese Laid-Open Application No. 2004-535586, published on Nov. 25, 2004) are exemplified.

Patent Document 1 describes a synchronous measurement system that has a controller and a sensor unit connected to the controller. The synchronous measurement system synchronizes measurement data by the controller sending a plurality of synchronization commands to the sensor unit at predetermined intervals and the sensor unit synchronizing each of the plurality of synchronization commands to send the measurement data to the controller. Patent Document 2 describes a method and an apparatus for synchronizing sensor data of sensor objects, which are obtained by at least one or more sensors at measurement timings unique to the sensors, with a common time base that is formed with a plurality of base timings. The method and the apparatus synchronize the sensor data with the common time base by using parameters that characterize the sensor objects as the sensor data to obtain parameter values at the base timings based on the measurement timings and the parameter values at the measurement timings.

FIG. 10 is a diagram illustrating, in a time-series manner, communication between a higher-level device and a reader/writer and communication (contact) of a tag A, a tag B, or a tag C with the reader/writer in the aforementioned technology in which a sensor management device (for example, the reader/writer) communicates with a plurality of wireless sensors (tags) in a time division manner (the horizontal axis represents a time). As illustrated by hatching in FIG. 10, since the communication between the reader/writer and the tag A, the tag B, and the tag C is performed in a time division manner, the tag A, the tag B, and the tag C each receive sensor information acquisition start commands at different timings and each execute acquisition of the sensor information at different timings (the acquisition of the sensor information is started at a timing at which communication between the reader/writer and the tag A, the tag B, or the tag C is completed). Also, the tag A, the tag B, and the tag C each receive data collection instruction commands at different timings and each transmit the sensor information to the reader/writer at different timings. Therefore, there is a problem that the plurality of sensor information that the reader/writer has received from the tag A, the tag B, and the tag C are not synchronized with each other.

In the related art, it is not possible to accurately analyze the sensor information if the plurality of sensor information received from the plurality of wireless sensors are not synchronized. In a configuration in which wireless sensors are each attached to a plurality of robots, for example, there is a problem that consistency cannot be kept between operation content indicated by the sensor information and actual operation content if time deviation is present when coordinated operations of the plurality of robots are measured.

Therefore, it is necessary to synchronize the plurality the sensor information even in the technology in which the sensor management device communicates with the plurality of wireless sensors in a time division manner as in the above technologies described in Patent Documents 1 and 2.

In view of the above description, a technology is provided that enables synchronization of a plurality of sensor information for a technology in which a sensor management device communicates with a plurality of wireless sensors in a time division manner.

SUMMARY

In view of above description, according to an aspect of the disclosure, there is provided a sensor management device that receives a plurality of sensor information from a plurality of wireless sensors that acquire the sensor information respectively by performing sampling for plural times at predetermined cycles in a common period, the sensor management device including: a transmission unit that transmits acquisition start instructions for starting acquisitions of the plurality of sensor information to the plurality of wireless sensors respectively at different timings; and an extraction unit that extracts a plurality of common period sensor information, which the plurality of wireless sensors have acquired in the common period, from the plurality of sensor information with reference to deviation of times at which the transmission unit has transmitted the acquisition start instructions to the plurality of wireless sensors.

According to another aspect of the disclosure, there is provided a sensor management device that receives a plurality of sensor information from a plurality of wireless sensors that acquire the sensor information respectively by performing sampling for plural times at predetermined cycles in a common period, the sensor management device including: a transmission unit that transmits acquisition start instructions for the plurality of sensor information to the plurality of wireless sensors respectively at different timings; and a setting unit that sets delay times, with which acquisitions of the sensor information are delayed, for the plurality of wireless sensors respectively with reference to deviations of respective times at which the transmission unit has transmitted the acquisition start instructions to the plurality of wireless sensors. The transmission unit causes the plurality of wireless sensors to acquire common period sensor information respectively in the common period by further transmitting delay instructions for causing the acquisitions of the plurality of sensor information to be delayed to the plurality of wireless sensors in the delay times from the respective times at which the acquisition start instructions are transmitted to the plurality of wireless sensors.

According to another aspect of the disclosure, there is provided a sensor information synchronization method that is performed by a sensor management device that receives a plurality of sensor information from a plurality of wireless sensors that acquire the sensor information respectively by performing sampling for plural times at predetermined cycles in a common period, the method including: transmitting acquisition start instructions for starting acquisitions of the plurality of sensor information to the plurality of wireless sensors respectively at different timings; and extracting a plurality of common period sensor information that the plurality of wireless sensors have acquired in the common period from the plurality of sensor information with reference to deviation of times at which the acquisition start instructions have been transmitted to the plurality of wireless sensors during transmitting the acquisition start instructions.

According to another aspect of the disclosure, there is provided a sensor information synchronization method that is performed by a sensor management device that receives a plurality of sensor information from a plurality of wireless sensors that acquire the plurality of sensor information respectively by performing sampling for plural times at predetermined cycles in a common period, the method including: transmitting acquisition start instructions for the plurality of sensor information to the plurality of wireless sensors respectively at different timings; and setting delay times, with which acquisitions of the sensor information are delayed, for the plurality of wireless sensors respectively with reference to deviation of respective times at which the acquisition start instructions have been transmitted to the plurality of wireless sensors during transmitting the acquisition start instructions During transmitting the acquisition start instructions, the plurality of wireless sensors is caused to acquire common period sensor information respectively in the common period by further transmitting delay instructions for causing the acquisitions of the sensor information to be delayed to the plurality of wireless sensors in the delay times from respective times at which the acquisition start instructions are transmitted to the plurality of wireless sensors.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DESCRIPTION OF THE EMBODIMENTS

First Embodiment

Hereinafter, an embodiment according to an aspect of the disclosure (hereinafter, also referred to as "the embodiment") will be described in detail. However, the configuration described in the embodiment is not intended to limit the scope of the disclosure and is merely an example for explanation unless particularly specified otherwise.

1. Application Example

Figure 1:
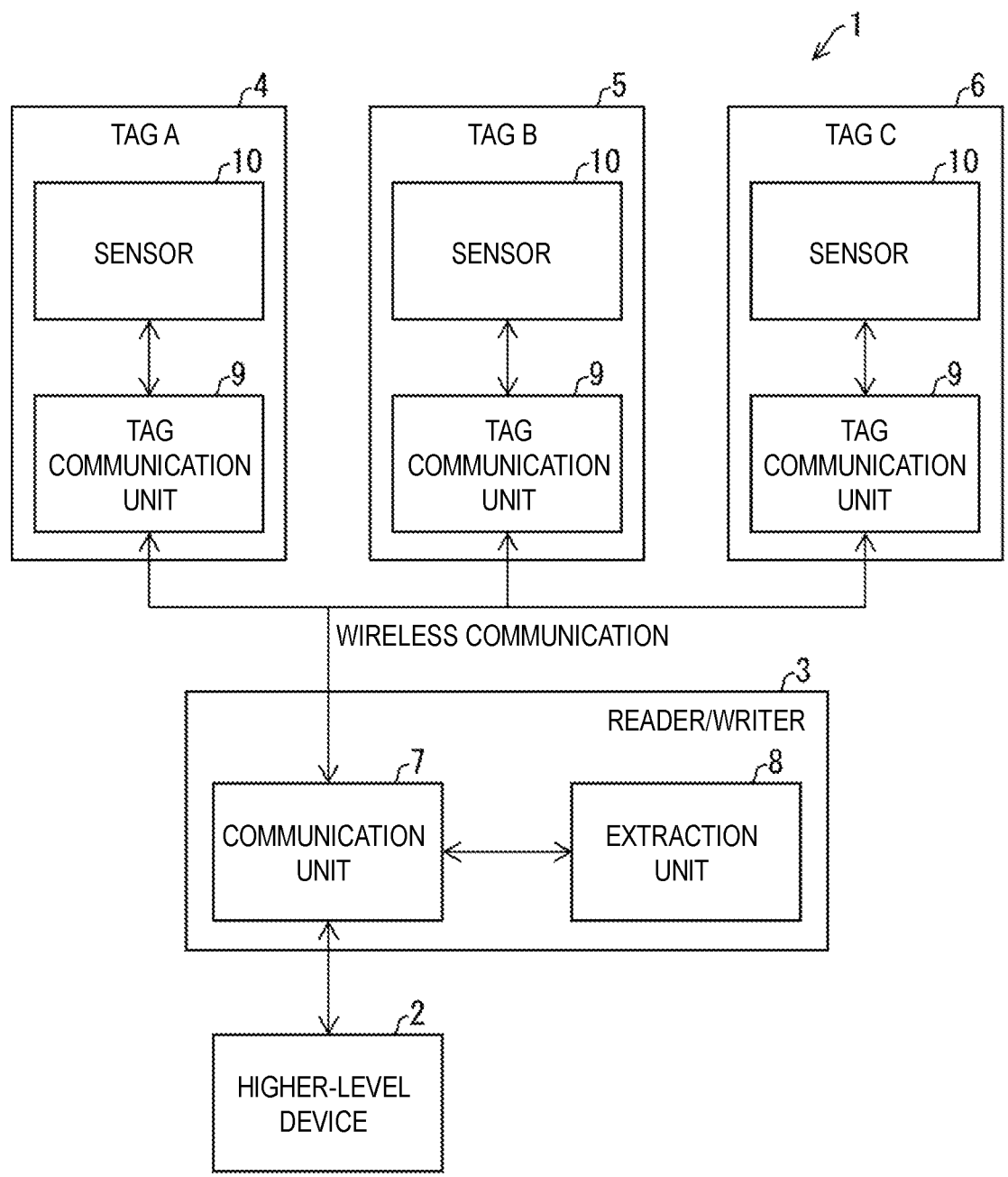
FIG. 1 is a block diagram illustrating a configuration of a sensor information acquisition system that includes a reader/writer according to a first embodiment of the disclosure.

FIG. 1 is a block diagram illustrating a configuration of a sensor information acquisition system 1 that includes a reader/writer 3 according to the first embodiment of the disclosure (details of each components of the sensor information acquisition system 1 will be described later). First, an outline of a sensor information synchronization method that the reader/writer 3 illustrated in FIG. 1 executes will be described in order to facilitate understanding of the method.

The reader/writer 3 transmits sensor information acquisition start commands for starting acquisition of sensor information to a tag A4, a tag B5, and a tag C6 respectively at different timings. Then, the tag A4, the tag B5, and the tag C6 respectively receive the sensor information acquisition start commands at different timings and respectively start the acquisition of sensor information at different timings based on the sensor information acquisition start commands. This configuration has a problem that the plurality of the sensor information that the reader/writer 3 has received from the tag A4, the tag B5, and the tag C6 are not synchronized.

Thus, the reader/writer 3 according to the embodiment extracts, from the plurality of the sensor information, a plurality of common period sensor information that the tag A4, the tag B5, and the tag C6 have acquired in a common period with reference to deviations of times at which the sensor information acquisition start commands have been transmitted to the tag A4, the tag B5, and the tag C6.

For example, according to an aspect of the embodiment, the reader/writer 3 extracts, from the plurality of the sensor information, the sensor information (common period sensor information) that the tag A4, the tag B5, and the tag C6 have respectively acquired at or after the latest time among the respective times at which the sensor information acquisition start commands (acquisition start instructions) are transmitted to the tag A4, the tag B5, and the tag C6 in the process.

2. Configuration Example (Object of Time Correction)

Figure 2:
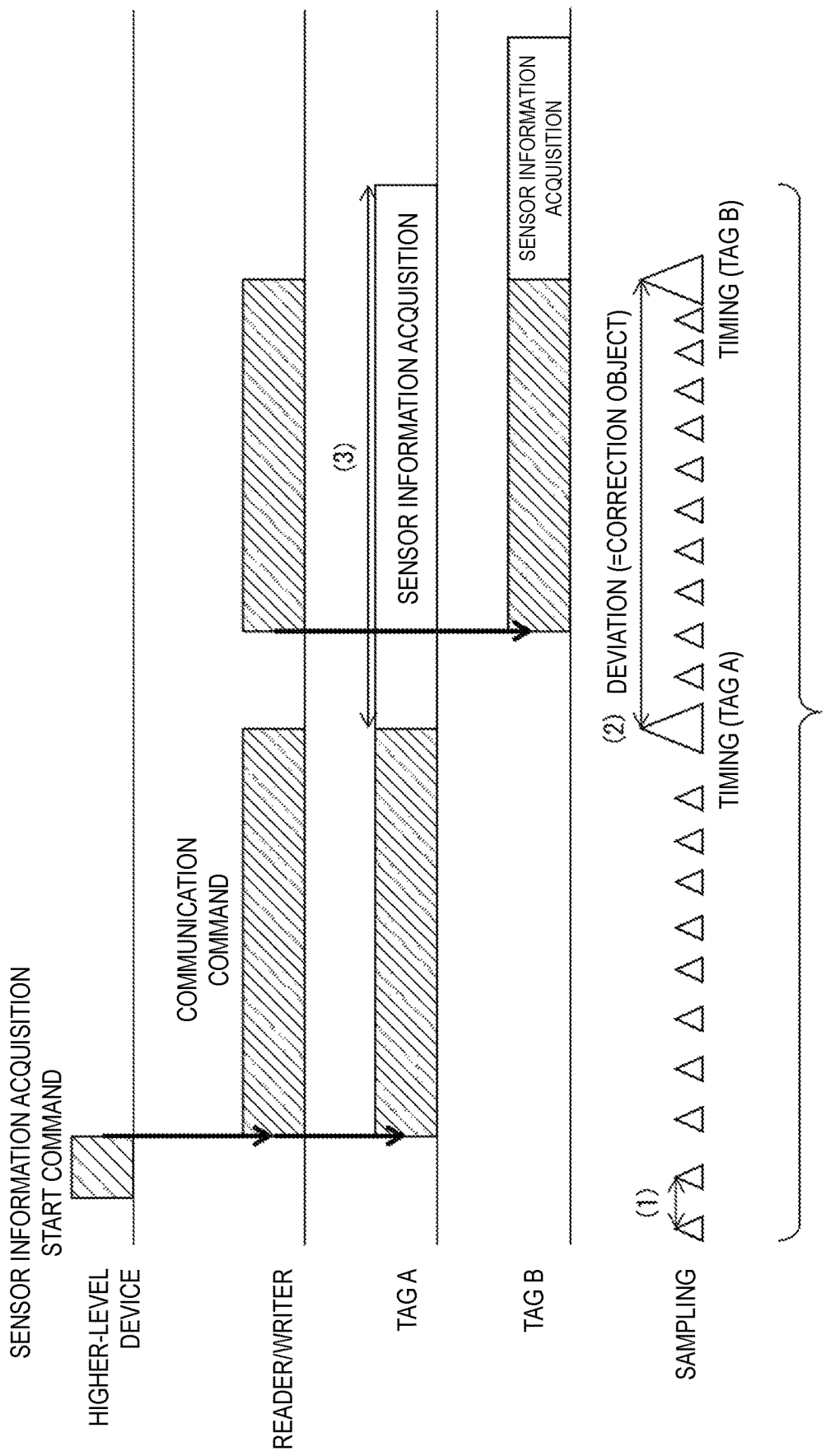
FIG. 2 is a diagram illustrating, in a time-series manner, cycles of communication between a higher-level device and the reader/writer, contact of a tag A or a tag B with the reader/writer, and sampling of sensor information with the tag A and the tag B according to the first embodiment of the disclosure.
Figure 10:
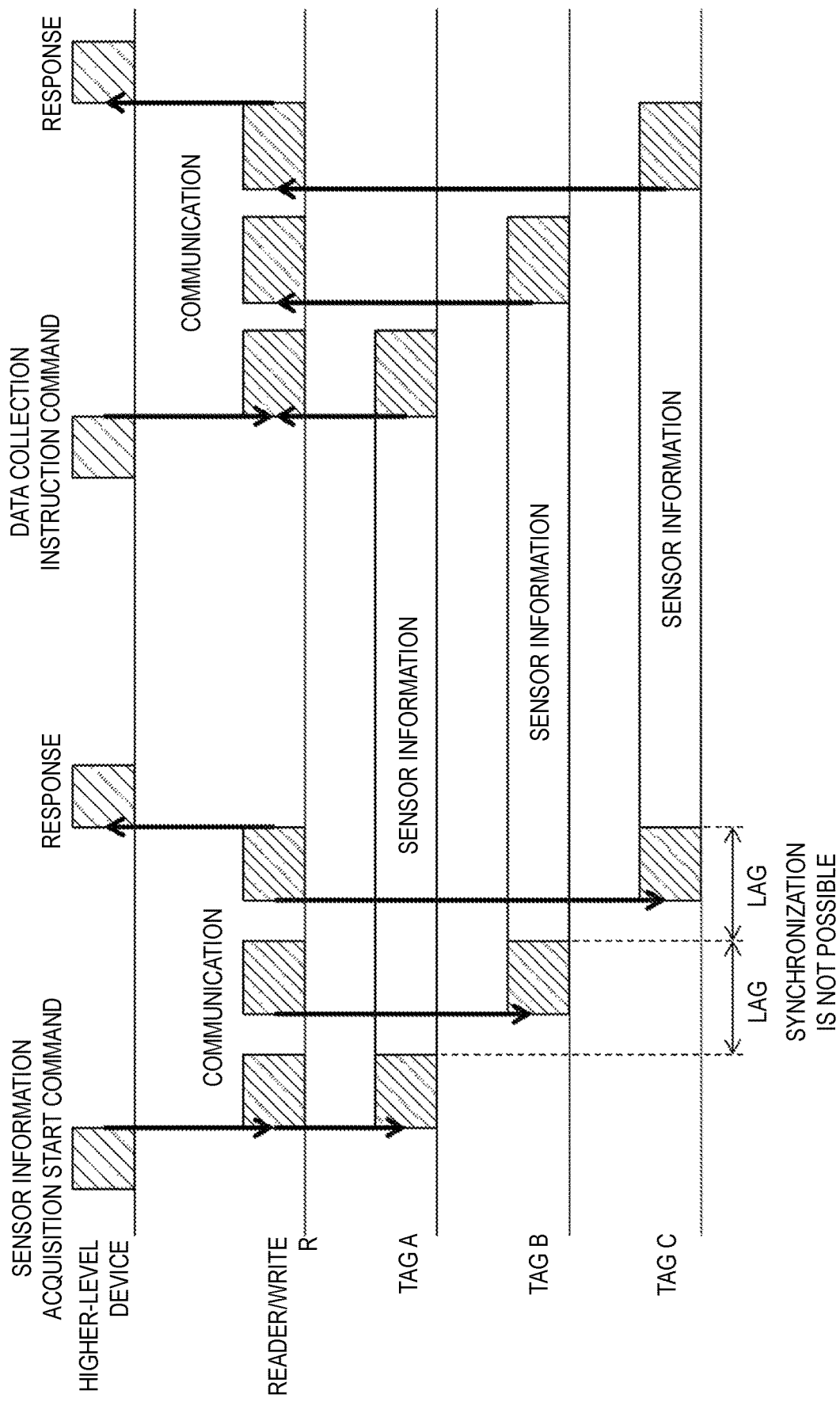
FIG. 10 is a diagram illustrating, in a time-series manner, communication between a higher-level device and a reader/writer and communication of a tag A, a tag B, or a tag C with a reader/writer according to the related art.

FIG. 2 is a diagram illustrating, in a time-series manner, communication between the higher-level device 2 and the reader/writer 3, contact between the reader/writer 3 and the tag A4 or the tag B5, and sampling cycles of the sensor information made by the tag A4 and the tag B5 (FIG. 2 is a diagram similar to FIG. 10). In addition, the small triangular marks in FIG. 2 indicate sampling timings. (1) in FIG. 2 indicates one sampling cycle. The large triangular marks indicate acquisition start times of sensor information made by the tag A4 and the tag B5. Hereinafter, an object on which the reader/writer 3 is to perform time correction according to the embodiment will be described with reference to FIG. 2. As illustrated in FIG. 2, time deviation indicated in (1) to (3) may occur in the contact between the reader/writer 3 and the tag A4 or the tag B5. In this manner, a problem may occur that the sensor information acquired by the tag A4 and the sensor information acquired by the tag B5 are not synchronized with each other.

The tag A4 and the tag B5 perform sampling of the sensor information at the same sampling cycle. However, the sampling timing of the tag A4 and the sampling timing of the tag B5 are not synchronized with each other. Therefore, a time deviation may occur between the timing at which the sensor information is sampled by the tag A4 and the timing at which the sensor information is sampled by the tag B5. However, even in a case that the time deviation occurs, the higher-level device 2 or the like may correct the time deviation of the sensor information. In that case, the deviation between the sampling cycle of the tag A4 and the sampling cycle of the tag B5 can be half the time of these sampling cycles at maximum. For example, the higher-level device 2 may generate the sensor information of the tag A4 according to the sampling timing of the sensor information of the tag B5 by interpolating the time-series sensor information of the tag A4 through interpolation.

In addition, the time deviation illustrated as (2) in FIG. 2 may occur between the sensor information acquisition start time of the tag A4 and the sensor information acquisition start time of the tag B5. This is because the sensor information acquisition start commands (acquisition start instructions) for starting acquisition of the sensor information are transmitted to each of the tag A4 and the tag B5 at the different timings (time-division transmission, and additionally, the tag A4 and the tag B5 start to acquire the sensor information at the same time of the end of the communication with the reader/writer 3, for example). A main purpose of the embodiment is to correct the time deviation of (2) in FIG. 2. The correction for the time deviation will be described later.

In addition, a time deviation may occur due to a difference between a period during which the tag A4 acquires the sensor information and a period during which the tag B5 acquires the sensor information as indicated by (3) in FIG. 2. The correction for the time deviation will also be described later.

(Configurations of Main Parts of Reader/Writer 3)

FIG. 1 is a block diagram illustrating a configuration of the sensor information acquisition system 1 that includes the reader/writer 3 according to the embodiment as described above. Hereinafter, configurations of main parts of the reader/writer 3 according to the embodiment will be described with reference to FIG. 1. As illustrated in FIG. 1, the sensor information acquisition system 1 includes the higher-level device 2, the reader/writer 3 (sensor management device), the tag A4, the tag B5, and the tag C6. Note that, as an example of a wireless communication technology between the reader/writer 3 and the tag A4, the tag B5, or the tag C6 (a plurality of wireless sensors) employed here, a wireless communication technology of an RFID or the like between the tag and the reader can be exemplified. Also, it is assumed that the tag A4, the tag B5, and the tag C6 are each attached to a plurality of robots, for example, to detect the respective operations of the plurality of robots in the embodiment.

The higher-level device 2 is connected to the reader/writer 3 and transmits sensor information acquisition start commands (acquisition start instructions) to the reader/writer 3. As an example of the above device, a personal computer or the like can be exemplified.

The reader/writer 3 (sensor management device) includes a communication unit 7 (that serves both as a transmission unit and as a receiving unit) and an extraction unit 8 and receives a plurality of sensor information from the tag A4, the tag B5, and the tag C6 (the plurality of wireless sensors).

More specifically, the communication unit 7 transmits sensor information acquisition start commands received from the higher-level device to each of the tag A4, the tag B5, and the tag C6 (the plurality of wireless sensors) at the different timings (time-division wireless transmission). In addition, the communication unit 7 receives a plurality of sensor information from each of the tag A4, the tag B5, and the C6 at the different timings.

The extraction unit 8 extracts a plurality of common period sensor information that the tag A4, the tag B5, and the tag C6 have acquired in a common period from the plurality of sensor information that the communication unit 7 has received with reference to a deviation of time at which the communication unit 7 has transmitted the sensor information acquisition start commands to the tag A4, the tag B5, and the tag C6.

Each of the tag A4, the tag B5, and the tag C6 (the plurality of wireless sensors) includes a tag communication unit 9 and a sensor 10, and the sensor 10 starts to acquire (measure) the sensor information based on the sensor information acquisition start command that the tag communication unit 9 has received from the communication unit 7 of the reader/writer 3. In addition, the tag communication unit 9 transmits the sensor information that the sensor 10 has acquired to the communication unit 7. In addition, the sensor 10 of each of the tag A4, the tag B5, and the tag C6 acquires the sensor information by performing sampling for plural times at predetermined cycles in the common period. As examples of the tag A4, the tag B5, and the tag C6, passive tags, active tags, and the like in a radio frequency identifier (RFID) technology can be exemplified. In addition, the tag A4, the tag B5, and the tag C6 may or may not have a configuration for measuring time. Here, the tag A4, the tag B5, and the tag C6 do not have any clocks that are synchronized with each other.

(Sensor Information Synchronization Method)

Figure 3:
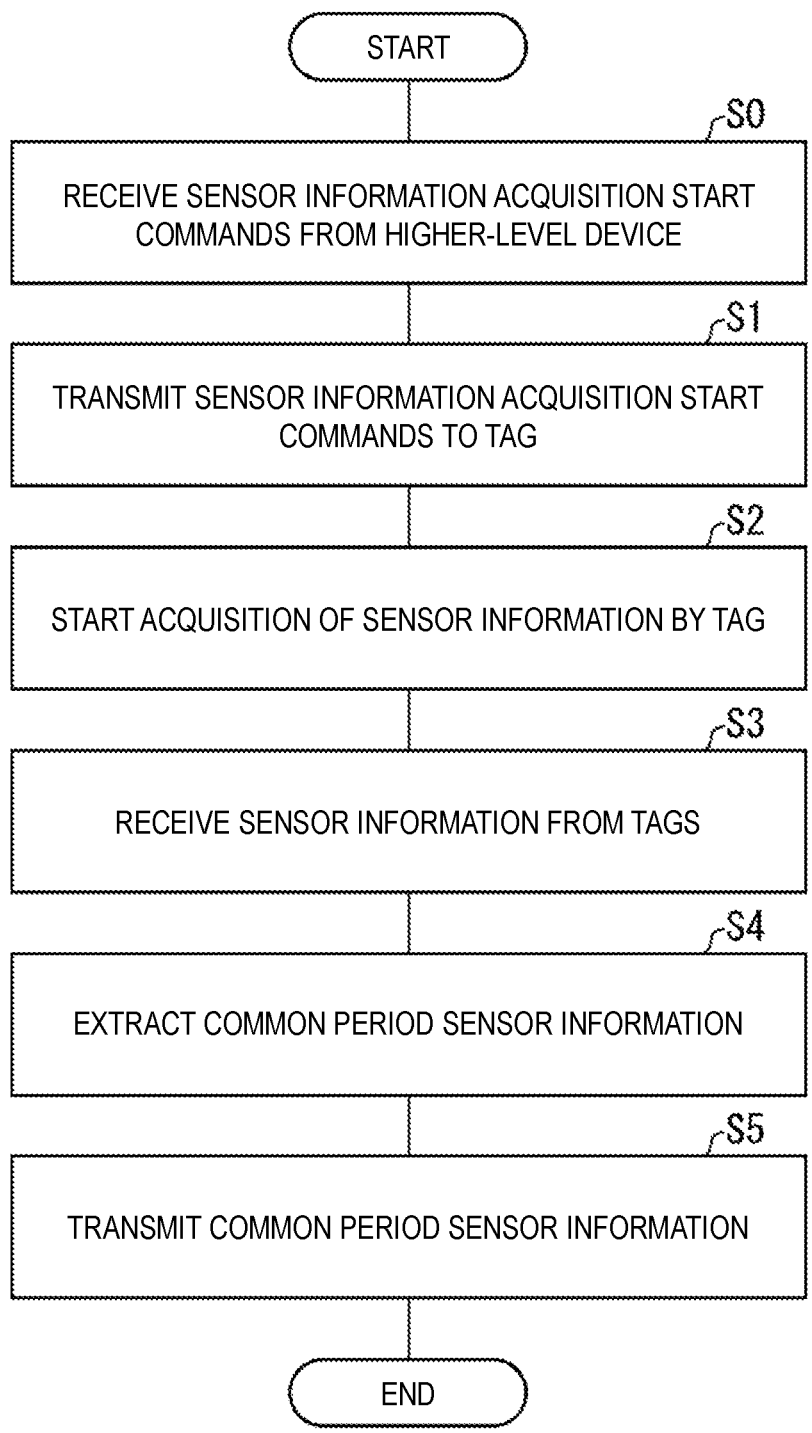
FIG. 3 is a flowchart for describing a sensor information synchronization method that is performed by the reader/writer according to the first embodiment of the disclosure.

FIG. 3 is a flowchart for describing the sensor information synchronization method that is performed by the reader/writer 3 according to the embodiment. Hereinafter, the sensor information synchronization method performed by the reader/writer 3 according to the embodiment will be described with reference to FIG. 3.

First, the communication unit 7 of the reader/writer 3 receives the sensor information acquisition start commands (acquisition start instructions) from the higher-level device 2 (Step S0).

Next, the communication unit 7 transmits the sensor information acquisition start commands received from the higher-level device to each of the plurality of tag communication units 9 of the tag A4, the tag B5, and the tag C6 (the plurality of wireless sensors) at the different timings (Step S1).

Next, the respective sensors 10 of the tag A4, the tag B5, and the tag C6 start to acquire sensor information based on the sensor information acquisition start command that the tag communication units 9 have received (Step S2). Then, the respective tag communication units 9 of the tag A4, the tag B5, and the tag C6 transmit the acquired sensor information to the communication unit 7. As examples of the sensor information that the sensors 10 acquire, acceleration data, environmental sound data, temperature data, and the like can be exemplified. In addition, as examples of the timings at which the tag communication units 9 transmit the sensor information to the communication unit 7, timings at which data collection instruction commands, which will be described later, are received, timings at which built-in memories store the sensor information up to upper limits of capacity, timings at which a predetermined period elapses from the start of the acquisition of the sensor information, and the like can be exemplified. In addition, the time at which the communication unit 7 transmits the sensor information acquisition start commands to the tag communication units 9 (the time at which the transmission is completed) and the time at which the sensors 10 starts to acquire the sensor information are substantially the same.

Next, the communication unit 7 of the reader/writer 3 receives the sensor information from the respective tag communication units 9 of the tag A4. the tag B5, and the tag C6 (Step S3).

Next, the extraction unit 8 extracts the plurality of the common period sensor information that the tag A4, the tag B5, and the tag C6 have acquired in a common period from the plurality of the sensor information that the communication unit 7 has received in Step S3 with reference to the deviation of the times at which the communication unit 7 has transmitted the sensor information acquisition start commands to the respective tag communication units 9 of the tag A4, the tag B5, and the tag C6 in Step S1 (Step S4). Details of the method by which the extraction unit 8 extracts the common period sensor information will be described later.

The communication unit 7 transmits the plurality of common period sensor information that the extraction unit 8 has extracted in Step S4 to the higher-level device 2 (Step S5).

If the aforementioned processes are summarized, the reader/writer 3 (sensor management device) according to the embodiment is a sensor management device that receives a plurality of sensor information from the tag A4, the tag B5, and the tag C6 (the plurality of wireless sensors) that each acquires the sensor information by performing sampling for plural times at the predetermined cycles in the common period, and the reader/writer 3 includes the communication unit 7 (transmission unit) that transmits the sensor information acquisition start commands (acquisition start instructions) for starting the acquisition of the sensor information to each of the tag A4, the tag B5, and the tag C6 (the plurality of wireless sensor) at the different timings and the extraction unit that extracts the plurality of common period sensor information that the tag A4, the tag B5, and the tag C6 have acquired in the common period from the plurality of sensor information with reference to the deviation of the times at which the communication unit 7 has transmitted the sensor information acquisition start commands to the tag A4, the tag B5, and the tag C6.

With the above configuration, it is possible to recognize the respective times at which the plurality of wireless sensors has started to acquire the sensor information merely by referring to the respective timings at which the acquisition start instructions for starting the acquisition of the sensor information have been transmitted to the plurality of wireless sensors. In this manner, it is possible to synchronize the plurality of the sensor information transmitted in a time division manner. Also, it is possible to synchronize the plurality of sensor information even if the wireless sensors do not have a configuration of measuring time.

(Method of Extracting Common Period Sensor Information)

Figure 4:
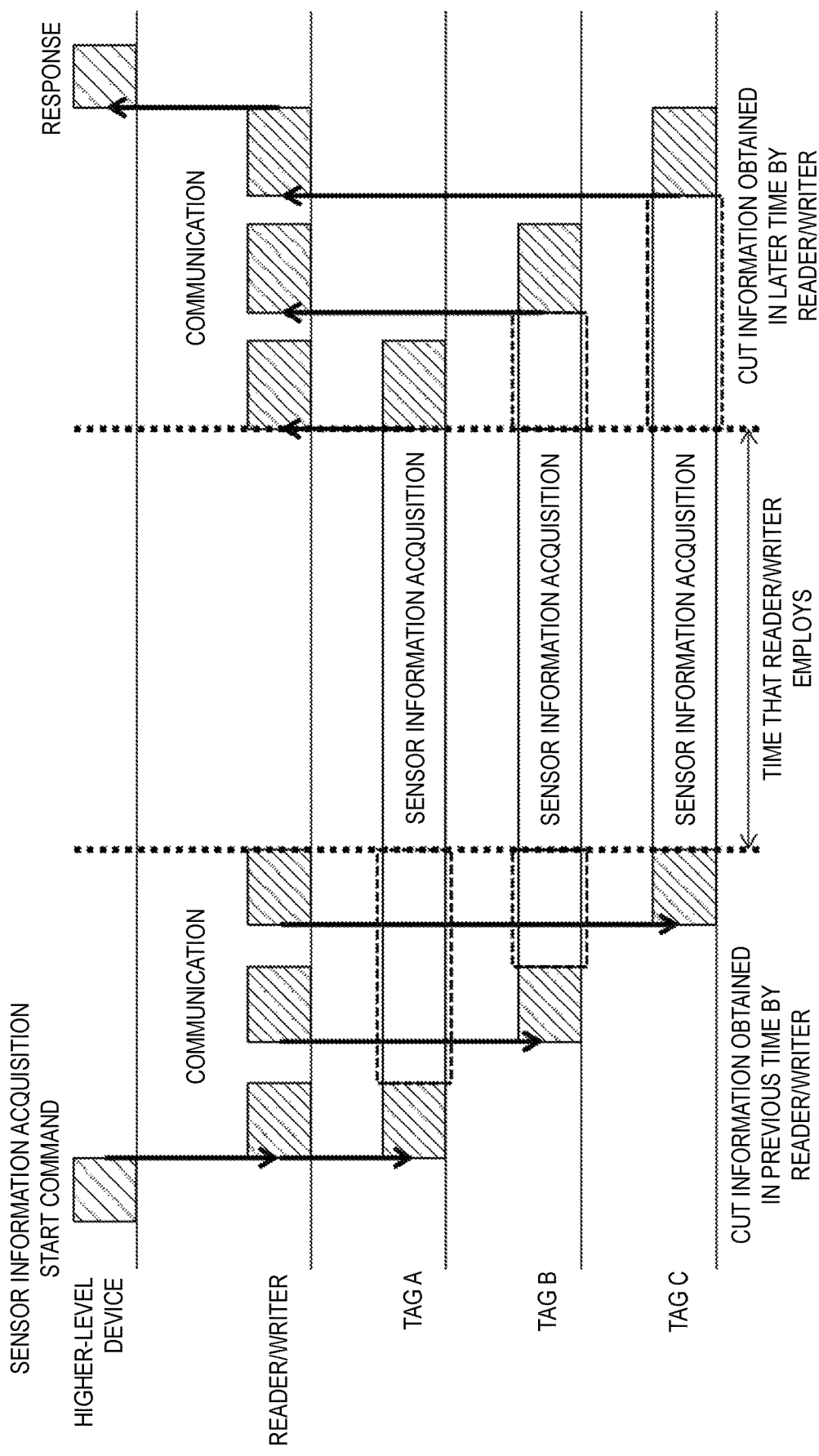
FIG. 4 is a diagram illustrating, in a time-series manner, communication between the higher-level device and the reader/writer and communication of the tag A, the tag B, or a tag C with the reader writer according to the first embodiment of the disclosure.

FIG. 4 is a diagram illustrating, a time-series manner, communication between the higher-level device 2 and the reader/writer 3 and communication (contact) between the reader/writer 3 and the tag A4, the tag B5, or the tag C6 according to the embodiment. Hereinafter, a specific method of extracting the common period sensor information in Step S4 described above will be described with reference to FIG. 4.

Since the communication of the reader/writer 3, the tag A4, the tag B5, and the tag C6 is performed in a time division manner as illustrated by hatching in FIG. 4, the tag A4, the tag B5, and the tag C6 each receive the sensor information acquisition start commands at the different timings (Step S1) and execute acquisition of the sensor information at the different timings (Step S2) (the acquisition of the sensor information is started at the timing at which the communication between the reader/writer 3 and the tag A4, the tag B5, or the tag C6 ends). Therefore, there is a problem that the plurality of sensor information that the reader/writer 3 has received from the tag A4, the tag B5, and the tag C6 are not synchronized with each other.

Thus, in Step S4 described above, the extraction unit 8 refers to the deviation between the time at which the communication unit 7 has transmitted the sensor information acquisition start command to the tag communication unit 9 of the tag A4 in Step S1 and the time at which the communication unit 7 has transmitted the sensor information acquisition start command to the tag communication unit 9 of the tag C6 in Step S1. Then, the extraction unit 8 cuts the sensor information (the portion surrounded by the dotted line in FIG. 4) that the sensor 10 of the tag A4 has acquired at or before the time at which the communication unit 7 has transmitted the sensor information acquisition start command to the tag communication unit 9 of the tag C6 (the time at which the sensor 10 of the tag C6 has started to acquire the sensor information). Also, in Step S4 described above, the extraction unit 8 refers to the deviation between the time at which the communication unit 7 has transmitted the sensor information acquisition start command to the tag communication unit 9 of the tag B5 in Step S1 and the time at which the communication unit 7 has transmitted the sensor information acquisition start command to the tag communication unit 9 of the tag C6 in Step S1. Then, the extraction unit 8 cuts the sensor information (the portion surrounded by the dotted line in FIG. 4) that the sensor 10 of the tag B5 has acquired at or before the time at which the communication unit 7 has transmitted the sensor information acquisition start command to the tag communication unit 9 of the tag C6 (the time at which the sensor 10 of the tag C6 has started to acquire the sensor information).

That is, as a result, the extraction unit 8 extracts the sensor information (common period sensor information) that each of the plurality of sensors 10 of the tag A4, the tag B5, and the tag C6 has acquired at or after the latest time (the time at which the sensor 10 of the tag C6 has started to acquire the sensor) among the respective times at which the communication unit 7 (transmission unit) has transmitted the sensor information acquisition start commands (acquisition start instructions) to the respective tag communication units 9 of the tag A4, the tag B5, and the tag C6 from the plurality of the sensor information that the communication unit 7 has received in Step S3.

With the above configuration, the common period sensor information is extracted from other sensor information in accordance with the latest time at which the acquisition start instruction for starting the acquisition of the sensor information is transmitted, that is, the latest acquisition start time at which the wireless sensor has started to acquire the sensor information. In this manner, it is possible to synchronize the plurality of the sensor information while minimizing useless sensor information that is not used by cutting only the sensor information that has not been synchronized.

In addition, the tag A4, the tag B5, and the tag C6 each transmit the sensor information to the reader/writer 3 at the different timings as illustrated by the hatching in FIG. 4 (Step S3). Therefore, there is a problem that the plurality of sensor information that the reader/writer 3 has received from the tag A4, the tag B5, and the tag C6 have not been synchronized.

Thus, in Step S4 described above, the extraction unit 8 refers to deviation between the time at which the communication unit 7 has started to receive the sensor information from the tag communication unit 9 of the tag A4 in Step S3 and the time at which the communication unit 7 has started to receive the sensor information from the tag communication unit 9 of the tag C6 in Step S3. Then, the extraction unit 8 cuts the sensor information (the portion surrounded by the dotted line in FIG. 4) that the sensor 10 of the tag C6 has acquired at or after the time at which the communication unit 7 has started to receive the sensor information from the tag communication unit 9 of the tag A4. Also, in Step S4 described above, the extraction unit 8 refers to the deviation between the time at which the communication unit 7 has started to receive the sensor information from the tag communication unit 9 of the tag A4 in Step S3 and the time at which the communication unit 7 has started to receive the sensor information from the tag communication unit 9 of the tag B5 in Step S3. Then, the extraction unit 8 cuts the sensor information (the portion surrounded by the dotted line in FIG. 4) that the sensor 10 of the tag B5 has acquired at or after the time at which the communication unit 7 has started to receive the sensor information from the tag communication unit 9 of the tag A4.

That is, as a result, the extraction unit 8 extracts the sensor information (common period sensor information) that each of the plurality of sensors 10 of the tag A4, the tag B5, and the tag C6 has acquired at or before the earliest time (in the above example, the time at which the communication unit 7 has started to receive the sensor information from the tag communication unit 9 of the tag A4) among the respective times at which the communication unit 7 (receiving unit) has started to receive the plurality of the sensor information from the respective tag communication units 9 of the tag A4, the tag B5, and the tag C6 from the plurality of the sensor information that the communication unit 7 has received in Step S3.

With the above configuration, the common period sensor information is extracted from other sensor information in accordance with the earliest reception start time at which the reception of the sensor information has been started, that is, the earliest acquisition completion time at which the wireless sensor has completed the acquisition of the sensor information. In this manner, it is possible to synchronize the plurality of the sensor information while minimizing useless sensor information that is not used by cutting only the sensor information that has not been synchronized.

Modification Example of First Embodiment

Figure 5:
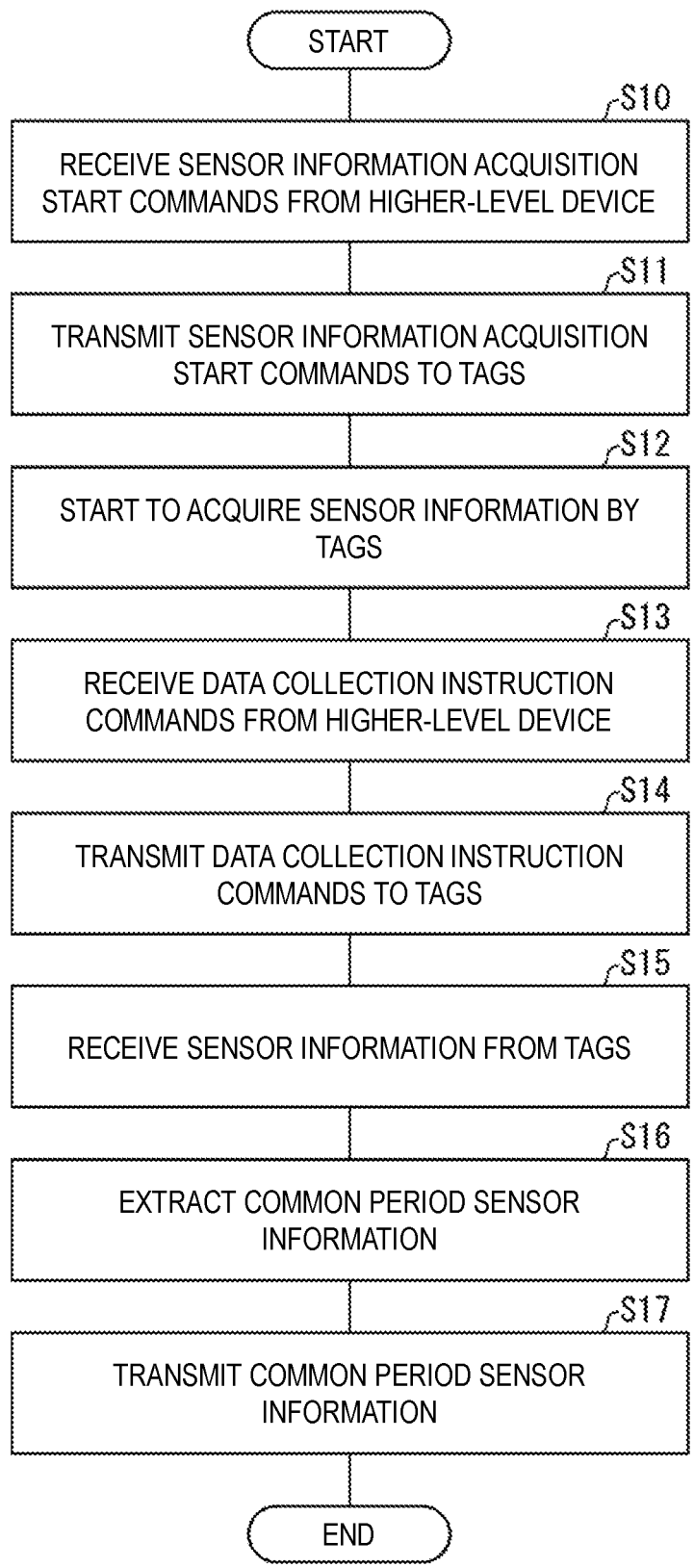
FIG. 5 is a flowchart for describing a sensor information synchronization method that is performed by a reader/writer according to a modification example of the first embodiment of the disclosure.
Figure 6:
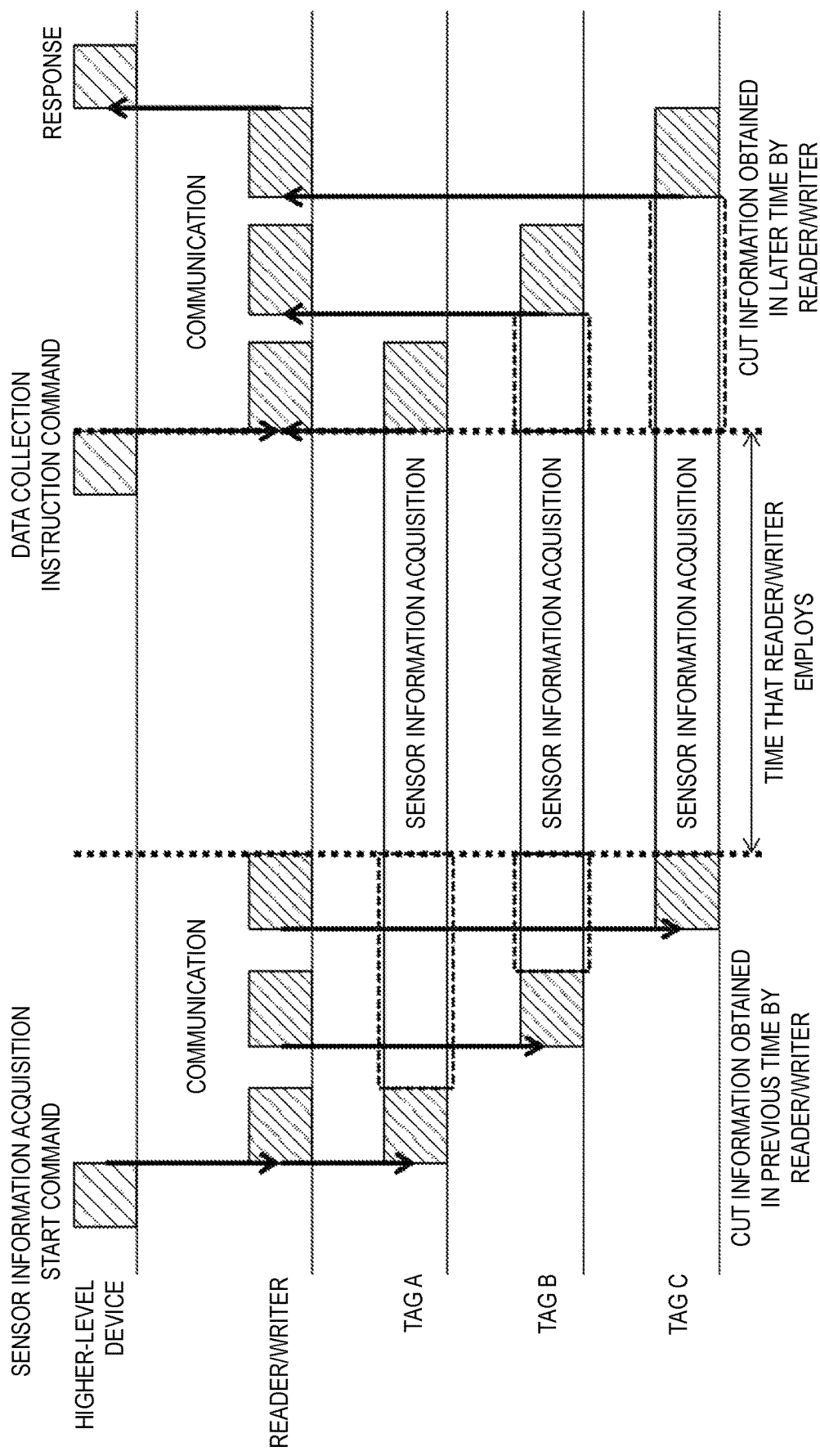
FIG. 6 is a diagram illustrating, in a time-series manner, communication between a higher-level device and a reader/writer and communication of a tag A, a tag B, or a tag C with the reader/writer according to a modification example of the first embodiment of the disclosure.

FIG. 5 is a flowchart for describing a sensor information synchronization method that is performed by a reader/writer 3 according to a modification example of the embodiment. FIG. 6 is a diagram illustrating, in a time-series manner, communication between the higher-level device 2 and the reader/writer 3 and communication (contact) of the reader/writer 3, the tag A4, the tag B5, or the tag C6 according to the modification example of the embodiment. Hereinafter, the sensor information synchronization method that is performed by the reader/writer 3 according to the modification example of the embodiment will be described with reference to FIG. 5. In addition, detailed description of processes that are similar to those in the above sensor information synchronization method according to the embodiment will be omitted.

First, the communication unit 7 of the reader/writer 3 receives the sensor information acquisition start commands (acquisition start instructions) from the higher-level device 2 (Step S10).

Next, the communication unit 7 transmits the sensor information acquisition start commands received from the higher-level device to each of the plurality of tag communication units 9 of the tag A4, the tag B5, and the tag C6 (the plurality of wireless sensors) at the different timings (Step S11).

Next, the respective sensors 10 of the tag A4, the tag B5, and the tag C6 start to acquire the sensor information based on the sensor information acquisition start commands that the tag communication units 9 have received (Step S12).

Next, the communication unit 7 of the reader/writer 3 receives data collection instruction commands (transmission instructions) from the higher-level device 2 (Step S13).

Next, the communication unit 7 transmits the data collection instruction commands received from the higher-level device to each of the plurality of tag communication units 9 of the tag A4, the tag B5, and the tag C6 (the plurality of wireless sensors) at the different timings (Step S14). Then, the respective tag communication units 9 of the tag A4, the tag B5, and the tag C6 transmits the sensor information to the communication unit 7 based on the data collection instruction commands.

Next, the communication unit 7 receives the sensor information from the respective tag communication units 9 of the tag A4, the tag B5, and the tag C6 (Step S15). In addition, the time at which the communication unit 7 has transmitted the data collection instruction commands to the tag communication units 9 and the time at which the communication unit 7 has started to receive the sensor information from the tag communication units 9 are substantially the same.

Next, the extraction unit 8 of the reader/writer 3 extracts the plurality of the common period sensor information that the tag A4, the tag B5, and the tag C6 have acquired in the common period from the plurality of the sensor information that the communication unit 7 has received in Step S3 with reference to the deviation of times at which the communication unit 7 has transmitted the sensor information acquisition start commands to the respective tag communication units 9 of the tag A4, the tag B5, and the tag C6 in Step S1 (Step S16).

The communication unit 7 of the reader/writer 3 transmits the plurality of the common period sensor information extracted in Step S4 to the higher-level device 2 (Step S17).

As illustrated by the hatching in FIG. 6, the tag A4, the tag B5, and the tag C6 each transmit the sensor information to the reader/writer at the different timings based on the data collection instruction commands (Step S14). Therefore, there is a problem that the plurality of the sensor information that the reader/writer 3 has received from the tag A4, the tag B5, and the tag C6 have not been synchronized.

Thus, in Step S16 described above, the extraction unit 8 refers to the deviation between the time at which the communication unit 7 has transmitted the data collection instruction command to the tag communication unit 9 of the tag A4 in Step S14 and the time at which the communication unit 7 has transmitted the data collection instruction command to the tag communication unit 9 of the tag C6 in Step S14. Then, the extraction unit 8 cuts the sensor information (the portion surrounded by the dotted line in FIG. 6) that the sensor 10 of the tag C6 has acquired at or after the time at which the communication unit 7 has transmitted the data collection instruction command to the tag communication unit 9 of the tag A4. In addition, in Step S16 described above, the extraction unit 8 refers to the deviation between the time at which the communication unit 7 has transmitted the data collection instruction command to the tag communication unit 9 of the tag A4 in Step S14 and the time at which the communication unit 7 has transmitted the data collection instruction command to the tag communication unit 9 of the tag B5 in Step S14. Then, the extraction unit 8 cuts the sensor information (the portion surrounded by the dotted line in FIG. 6) that the sensor 10 of the tag B5 has acquired at or after the time at which the communication unit 7 has transmitted the data collection instruction command to the tag communication unit 9 of the tag A4.

That is, as a result, the extraction unit 8 extracts the sensor information (common period sensor information) that each of the plurality of sensors 10 of the tag A4, the tag B5, and the tag C6 has acquired at or before the earliest time (in the aforementioned example, the time at which the communication unit 7 has transmitted the data collection instruction command to the tag communication unit 9 of the tag A4) among the respective times at which the communication unit 7 (transmission unit) has transmitted the data collection instruction commands (transmission instructions) to the respective tag communication unit 9 of the tag A4, the tag B5, and the tag C6 from the plurality of the sensor information that the communication unit 7 has received in Step S15.

With the above configuration, the common period sensor information is extracted from other sensor information in accordance with the earliest time at which the transmission instruction for transmitting the sensor information is transmitted, that is, the earliest acquisition completion time at which the wireless sensor has completed the acquisition of the sensor information. In this manner, it is possible to synchronize the plurality of the sensor information while minimizing useless sensor information that is not used by cutting only the sensor information that has not been synchronized.

Second Embodiment

A second embodiment of the disclosure will be described as follows with reference to the drawings. Note that the same reference numerals will be given to members that have the same functions as those included in the sensor information acquisition system 20 described in the first embodiment, and description thereof will be omitted.

Configurations of Main Parts of Reader/Writer 21

Figure 7:
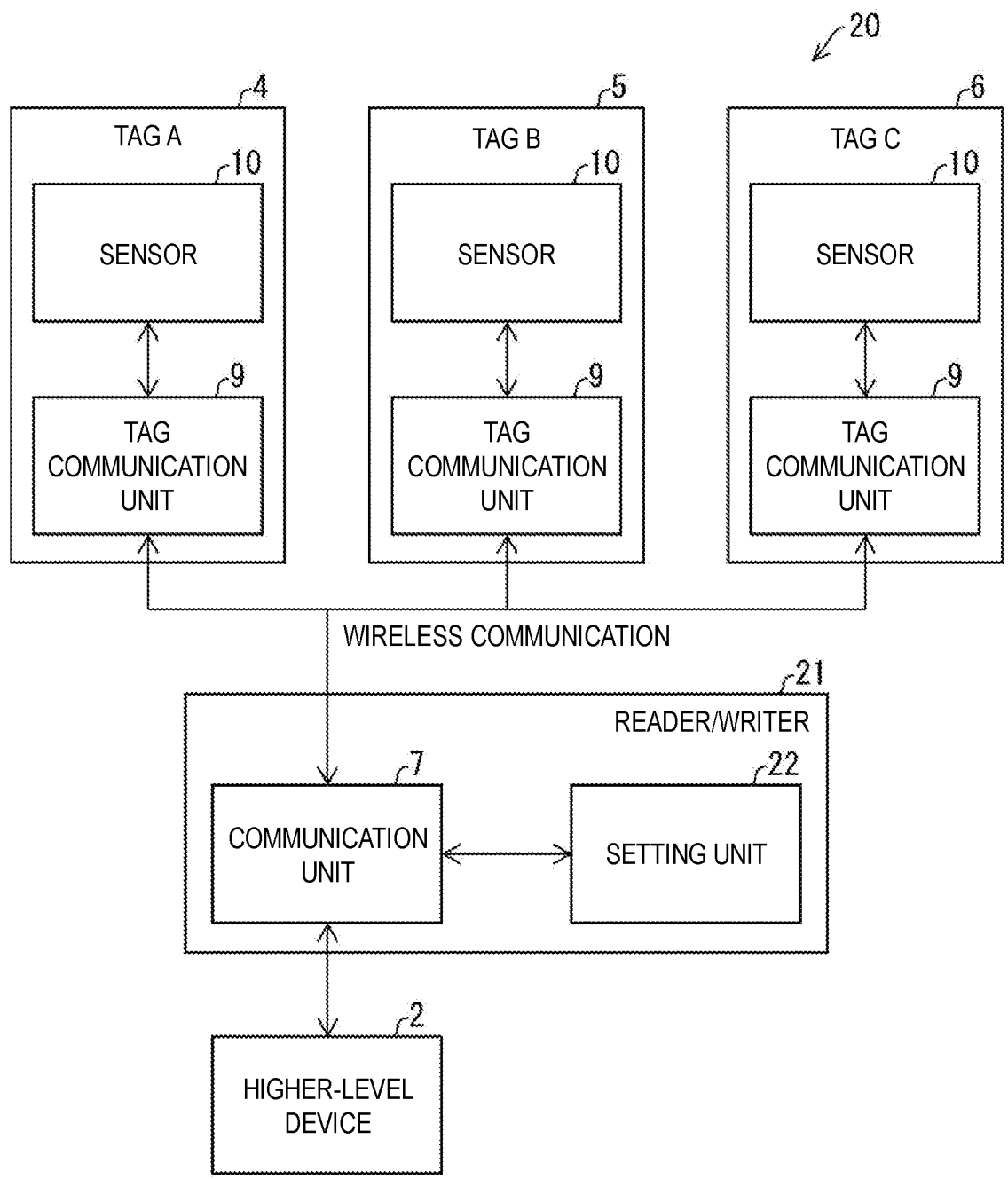
FIG. 7 is a block diagram illustrating a configuration of a sensor information acquisition system that includes a reader/writer according to a second embodiment of the disclosure.

FIG. 7 is a block diagram illustrating a configuration of a sensor information acquisition system 20 that includes a reader/writer 21 according to the embodiment. As illustrated in FIG. 7, the sensor information acquisition system 20 has a configuration that is similar to that of the sensor information acquisition system 20 according to the first embodiment except that the reader/writer 21 includes a setting unit 22 instead of the extraction unit 8.

The setting unit 22 sets a delay time with which acquisition of the sensor information is delayed for the tag A4, the tag B5, and the tag C6 with reference to the deviation of the respective times at which the communication unit 7 transmits the sensor information acquisition start commands (acquisition start instructions) to the plurality of tag communication units 9 of the tag A4, the tag B5, and the tag C6.

(Sensor Information Synchronization Method)

Figure 8:
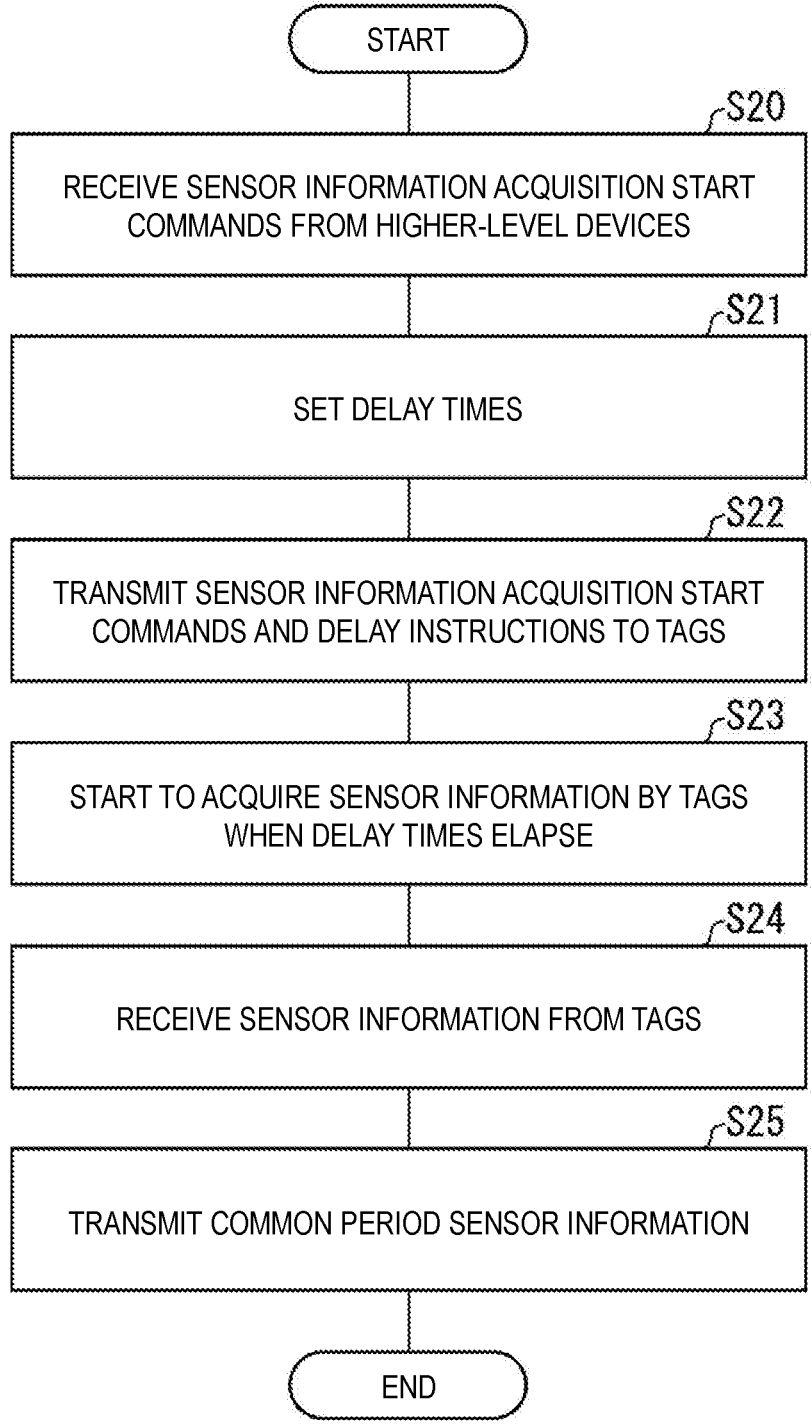
FIG. 8 is a flowchart for describing a sensor information synchronization method that is performed by the reader/writer according to the second embodiment of the disclosure.

FIG. 8 is a flowchart for describing a sensor information synchronization method that is performed by the reader/writer 21 according to the embodiment. Hereinafter, the sensor information synchronization method that is performed by the reader/writer 21 according to the embodiment will be described with reference to FIG. 8.

First, the communication unit 7 of the reader/writer 21 receives sensor information acquisition start commands (acquisition start instructions) from a higher-level device 2 (Step S20).

Next, the setting unit 22 sets delay times with which the acquisition of the sensor information is delayed for the tag A4, the tag B5, and the tag C6 with reference to the deviation of the respective times at which the communication unit 7 transmits the sensor information acquisition start commands to the plurality of tag communication units 9 of the tag A4, the tag B5, and the tag C6 (Step S21). Details of the method by which the setting unit 22 sets the delay times will be described later. Note that it is assumed that the setting unit 22 has recognized, in advance, the respective times at which the sensor information acquisition start commands are transmitted to the plurality of tag communication units 9 of the tag A4, the tag B5, and the tag C6, the respective periods (contact times) that are required to transmit the sensor information acquisition start commands to the plurality of tag communication units 9 of the tag A4, the tag B5, and the tag C6, the respective periods (communication times) that are required to transmit the sensor information acquisition start commands to the plurality of tag communication unit 9 of the tag A4, the tag B5, and the tag C6, and the like.

Next, the communication unit 7 transmits delay instructions for delaying acquisition of the sensor information during the delay times from the respective times at which the sensor information acquisition start commands have been transmitted to the plurality of tag communication units 9 of the tag A4, the tag B5, and the tag C6 (the delay time set in Step S21) and the sensor information acquisition start commands received from the higher-level device to each of the plurality of tag communication units 9 of the tag A4, the tag B5, and the tag C6 at the different timings (Step S22).

Next, the respective sensors 10 of the tag A4, the tag B5, and the tag C6 start to acquire the sensor information based on the sensor information acquisition start commands when the delay times indicated by the delay instructions elapse from the times (the times at which the communication unit 7 has transmitted the delay instructions) at which the tag communication units 9 have received the delay instructions (Step S23). Then, the respective tag communication units 9 of the tag A4, the tag B5, and the tag C6 transmit the acquired sensor information to the communication unit 7.

Next, the communication unit 7 receives the sensor information (common period sensor information) from the respective tag communication units 9 of the tag A4, the tag B5, and the tag C6 (Step S24).

The communication unit 7 transmits a plurality of common period sensor information received in Step S24 to the higher-level device 2 (Step S25).

(Method of Setting Delay Time)

Figure 9:
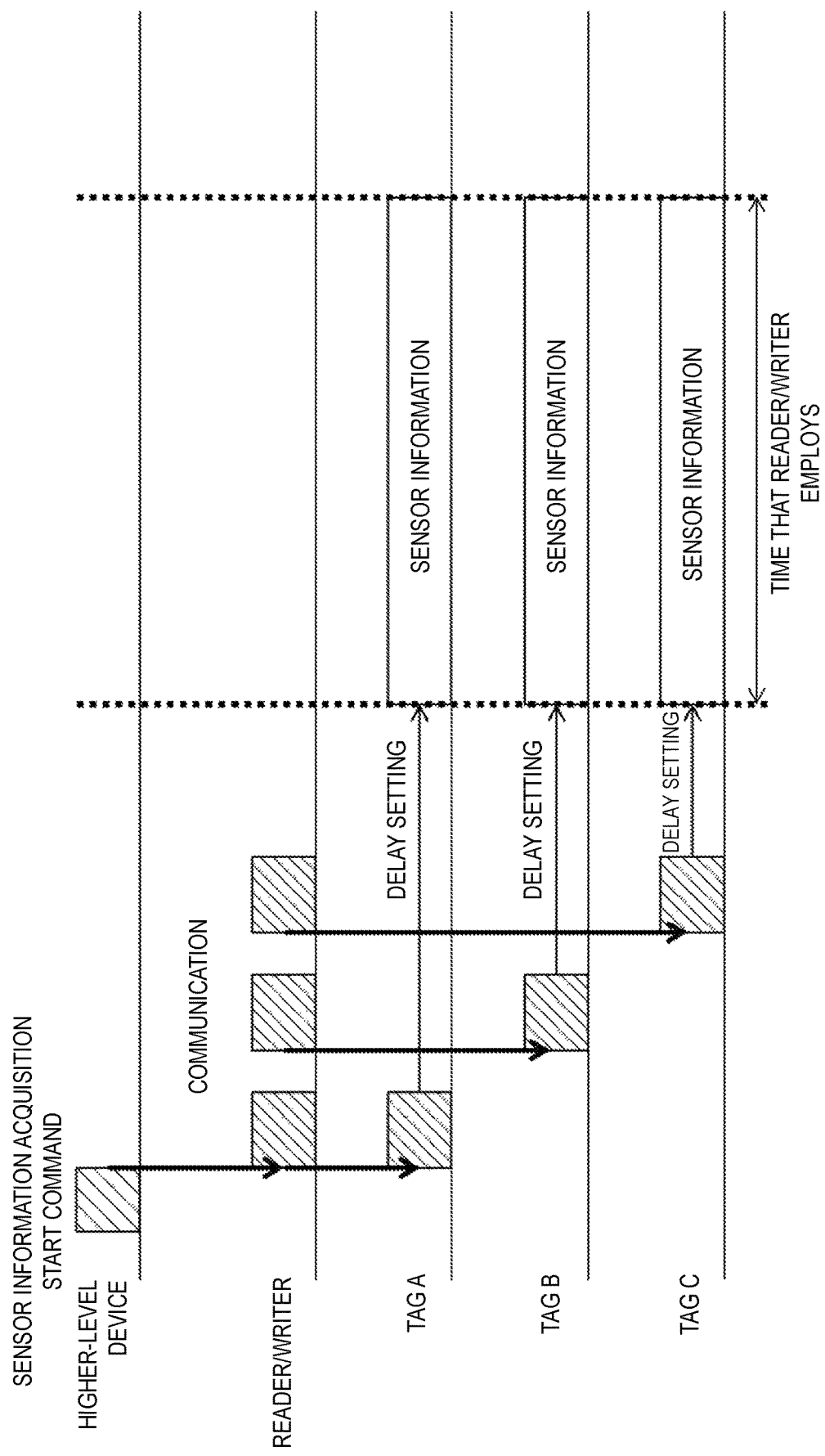
FIG. 9 is a diagram illustrating, in a time-series manner, communication between a higher-level device and the reader/writer and communication of a tag A, a tag B, or a tag C with the reader/writer according to the embodiment.

FIG. 9 is a diagram illustrating, in a time-series manner, communication between the higher-level device 2 and the reader/writer 21 and communication (contact) between the reader/writer 21 and the tag A4, the tag B5, or the tag C6 according to the embodiment. Hereinafter, a specific example of the method of setting the delay times in Step S21 described above will be described with reference to FIG. 9.

As illustrated by hatching in FIG. 9, the communication between the reader/writer 21 and the tag A4, the tag B5, and the tag C6 is performed in a time division manner. Therefore, there is a problem that the reader/writer 21 acquires a plurality of sensor information that have not been synchronized from the tag A4, the tag B5, and the tag C6 in a case that the tag A4, the tag B5, and the tag C6 each receive the sensor information acquisition start commands at the different timings and execute the acquisition of the sensor information at the different timings immediately after receiving the sensor information acquisition start command.

Thus, in Step S21 described above, the setting unit 22 refers to the deviation between the time at which the communication unit 7 transmits the sensor information acquisition start command to the tag communication unit 9 of the tag A4 in Step S22 and the time at which the communication unit 7 transmits the sensor information acquisition start command to the tag communication unit 9 of the tag C6 in Step S22. Then, the setting unit 22 sets a delay time for causing the sensor 10 of the tag A to start to acquire the sensor information at or after the time at which the communication unit 7 transmits the sensor information acquisition start command to the tag communication unit 9 of the tag C6 (the time at which the transmission is completed) in Step S22. Also, the setting unit 22 sets a delay time for causing the acquisition of the sensor information to be delayed in the sensor 10 of the tag C until the time at which the sensor 10 of the tag A starts to acquire the sensor information by further referring to the delay time.

Also, in Step S21 described above, the setting unit 22 refers to the deviation between the time at which the communication unit 7 transmits the sensor information acquisition start command to the tag communication unit 9 of the tag A4 in Step S22 and the time at which the communication unit 7 transmits a sensor information acquisition start command to the tag communication unit 9 of the tag B5 in Step S22. Then, the setting unit 22 sets the delay time for causing the acquisition of the sensor information by the sensor 10 of the tag B to be delayed up to the time at which the sensor 10 of the tag A starts to acquire the sensor information by further referring to the above delay time for the sensor 10 of the tag A.

As described above, the setting unit 22 sets the delay times for the respective tags, and the respective sensors 10 of the tag A4, the tag B5, and the tag C6 start to acquire the sensor information based on the sensor information acquisition start commands when the delay times elapse from the times at which the tag communication units 9 receive the delay instructions (the times at which the communication unit 7 transmits the delay instructions) in Step S23 described above. In this manner, the respective sensors 10 of the tag A4, the tag B5, and the tag C6 are caused to acquire the common period sensor information in the common period.

(Summary of Second Embodiment)

As described above, the reader/writer 21 (sensor management device) according to the embodiment further includes a setting unit that sets delay times with which acquisition of the sensor information is delayed for the tag A4, the tag B5, and the tag C6 with reference to deviation of the respective times at which the communication unit 7 (transmission unit) transmits the sensor information acquisition start commands (acquisition start instructions) to the tag A4, the tag B5, and the tag C6. Also, the reader/writer 21 according to the embodiment causes each of the tag A4, the tag B5, and the tag C6 to acquire the common period sensor information in the common period by further transmitting the delay instructions for causing acquisition of the sensor information to be delayed to the tag A4, the tag B5, and the tag C6 during the delay times from the respective times at which the communication unit 7 (transmission unit) has transmitted the sensor information acquisition start commands (acquisition start instructions) to the tag A4, the tag B5, and the tag C6.

With the above configuration, it is possible to set the respective delay times with which the sensor information acquisition start times of the wireless sensors are to be synchronized, merely by referring to the respective timings at which the sensor information acquisition start commands for causing acquisition of the sensor information to be started are transmitted to the plurality of wireless sensors. In this manner, it is possible to synchronize the plurality of sensor information transmitted in a time division manner. Also, it is not necessary to cut the sensor information that has not been synchronized, and it is possible to acquire the synchronized sensor information up to the upper limit of storage capacity with the wireless sensors. In addition, since useless sensor information that is not used are not acquired, it is possible to suppress power consumption of the wireless sensors.

(Supplementary Note)

Note that it is possible to apply the method of extracting the common period sensor information described in the first embodiment to the sensor information synchronization method that is performed by the reader/writer 21 according to the embodiment. In that case, the reader/writer 21 further includes the extraction unit 8, and after Step S24 described above, the extraction unit 8 extracts the sensor information that each of the plurality of sensors 10 of the tag A4, the tag B5, and the tag C6 has acquired at or after the latest time among the respective times at which the communication unit 7 (transmission unit) has transmitted the sensor information acquisition start commands to the respective tag communication units 9 of the tag A4, the tag B5, and the tag C6 from the plurality of sensor information that the communication unit 7 has received. Alternatively, after Step S24 described above, the extraction unit 8 extracts the sensor information that each of the plurality of sensors 10 of the tag A4, the tag B5, and the tag C6 has acquired at or before the earliest time among the respective times at which the communication unit 7 has transmitted the data collection instruction commands to the respective tag communication units 9 of the tag A4, the tag B5, and the tag C6 from the plurality of sensor information that the communication unit 7 has received.

[Implementation Example Using Software]

Control blocks (particularly, the extraction unit 8 and the setting unit 22) of the reader/writer 3 and the reader/writer 21 (sensor management device) may be implemented by logical circuits (hardware) formed on integrated circuits (IC chips) or the like or may be implemented by software.

In the latter case, the reader/writer 3 and the reader/writer 21 include computers that execute instructions of a program that is software for implementing the respective functions. Each of the computers includes one or more processor, for example, and includes a computer-readable recording medium that stores the program therein. In addition, the object of the disclosure is achieved by the processor reading the program from the recording medium and executing the program in the computer. As the processor, a central processing unit (CPU), for example, can be used. As the recording medium, a tape, a disc, a card, a semiconductor memory, a programmable logical circuit, or the like can be used as well as a "non-transitory tangible medium" such as a read only memory (ROM), for example. Also, a random access memory (RAM) that develops the program and the like may further be provided. In addition, the program may be supplied to the computer via an arbitrary transmission medium (such as a communication network or broadcasting waves) capable of transmitting the program. Note that an aspect of the disclosure can also be implemented in the form of data signals incorporated in carrier waves in which the program is realized through electronic transmission.

[Other Configurations]

According to an aspect of the disclosure, there is provided a sensor management device that receives a plurality of sensor information from a plurality of wireless sensors that acquire the sensor information respectively by performing sampling for plural times at predetermined cycles in a common period, the sensor management device including: a transmission unit that transmits acquisition start instructions for starting acquisitions of the plurality of sensor information to the plurality of wireless sensors respectively at different timings; and an extraction unit that extracts a plurality of common period sensor information, which the plurality of wireless sensors have acquired in the common period, from the plurality of sensor information with reference to deviation of times at which the transmission unit has transmitted the acquisition start instructions to the plurality of wireless sensors.

With the above configuration, it is possible to recognize the respective times at which the plurality of wireless sensors starts to acquire the sensor information merely by referring to the respective timings at which the acquisition start instructions for starting the acquisition of the sensor information are transmitted to the plurality of wireless sensors. In this manner, it is possible to synchronize the plurality of sensor information transmitted in a time division manner with each other. Also, it is possible to synchronize the plurality of sensor information even if the wireless sensors do not have a configuration for measuring time.

In the sensor management device according to the aspect of the disclosure, the extraction unit may extract, from the plurality of sensor information, the plurality of common period sensor information that the plurality of wireless sensors has acquired respectively at or after a time that is the latest among respective times at which the transmission unit transmits the acquisition start instructions to the plurality of wireless sensors.

With the above configuration, the plurality of common period sensor information is extracted among other sensor information in accordance with the time that is the latest among the times at which the acquisition start instructions for starting the acquisition of the sensor information are transmitted, that is, in accordance with an acquisition start time at which the wireless sensor starts to acquire the sensor information at the latest time. In this manner, it is possible to synchronize the plurality of sensor information while minimizing useless sensor information that is not used by cutting only sensor information that has not been synchronized.

The sensor management device according to the aspect of the disclosure may further include a receiving unit that receives the plurality of sensor information respectively from the plurality of wireless sensors at different timings, and the extraction unit may extract, from the plurality of sensor information, the plurality of common period sensor information that the plurality of wireless sensors have acquired respectively at or before a time that is the earliest among respective times at which the receiving unit starts to receive the plurality of sensor information from the plurality of wireless sensors.

With the above configuration, the plurality of common period sensor information is extracted from other sensor information in accordance with a reception start time at which reception of the sensor information is started at the earliest time, that is, an acquisition completion time at which the wireless sensor completes the acquisitions of the plurality of sensor information at the earliest time. In this manner, it is possible to synchronize the plurality of sensor information while minimizing useless sensor information that is not used by cutting only the sensor information that has not been synchronized.

In the sensor management device according to the aspect of the disclosure, the transmission unit may further transmit transmission instructions for causing the plurality of sensor information to be transmitted to the plurality of wireless sensors respectively at different timings, and the extraction unit may extract, from the plurality of sensor information, common period sensor information that the plurality of wireless sensors have each acquired at or before a time that is the earliest among respective times at which the transmission unit transmits the transmission instructions to the plurality of wireless sensors.

With the above configuration, the plurality of common period sensor information is extracted from other sensor information in accordance with the time that is the earliest time at which the transmission instruction for causing the sensor information to be transmitted is transmitted, that is, an acquisition completion time at which the wireless sensor completes the acquisitions of the plurality of sensor information at the earliest time. In this manner, it is possible to synchronize a plurality of sensor information while minimizing useless the sensor information that is not used by cutting only the sensor information that has not been synchronized.

According to an aspect of the disclosure, there is provided a sensor management device that receives a plurality of sensor information from a plurality of wireless sensors that acquire the sensor information respectively by performing sampling for plural times at predetermined cycles in a common period, the sensor management device including: a transmission unit that transmits acquisition start instructions for the plurality of sensor information to the plurality of wireless sensors respectively at different timings; and a setting unit that sets delay times, with which acquisitions of the sensor information are delayed, for the plurality of wireless sensors respectively with reference to deviations of respective times at which the transmission unit has transmitted the acquisition start instructions to the plurality of wireless sensors. The transmission unit causes the plurality of wireless sensors to acquire common period sensor information respectively in the common period by further transmitting delay instructions for causing the acquisitions of the plurality of sensor information to be delayed to the plurality of wireless sensors in the delay times from the respective times at which the acquisition start instructions are transmitted to the plurality of wireless sensors.

With the above configuration, it is possible to set the respective delay times with which the sensor information acquisition start times of the wireless sensors are synchronized merely by referring to the respective timings at which the sensor information acquisition start commands for starting the acquisitions of the plurality of sensor information are transmitted to the plurality of wireless sensors. In this manner, it is possible to synchronize the plurality of sensor information transmitted in a time division manner. Also, it is not necessary to cut the sensor information that has not been synchronized, and it is possible to acquire the synchronized sensor information up to the upper limit of storage capacity using the wireless sensors. In addition, since useless the sensor information that is not to be used is not acquired, it is possible to suppress power consumption of the wireless sensors.

According to an aspect of the disclosure, there is provided a sensor information synchronization method that is performed by a sensor management device that receives a plurality of sensor information from a plurality of wireless sensors that acquire the sensor information respectively by performing sampling for plural times at predetermined cycles in a common period, the method including: transmitting acquisition start instructions for starting acquisitions of the plurality of sensor information to the plurality of wireless sensors respectively at different timings; and extracting a plurality of common period sensor information that the plurality of wireless sensors have acquired in the common period from the plurality of sensor information with reference to deviation of times at which the acquisition start instructions have been transmitted to the plurality of wireless sensors during transmitting the acquisition start instructions.

With the above configuration, it is possible to recognize the respective times at which the plurality of wireless sensors starts to acquire the sensor information merely by referring to the respective timings at which the acquisition start instructions for starting the acquisitions of the plurality of sensor information are transmitted to the plurality of wireless sensors. In this manner, it is possible to synchronize the plurality of sensor information transmitted in a time division manner. Also, it is possible to synchronize the plurality of sensor information even if the wireless sensors do not have a configuration for measuring time.

According to an aspect of the disclosure, there is provided a sensor information synchronization method that is performed by a sensor management device that receives a plurality of sensor information from a plurality of wireless sensors that acquire the plurality of sensor information respectively by performing sampling for plural times at predetermined cycles in a common period, the method including: transmitting acquisition start instructions for the plurality of sensor information to the plurality of wireless sensors respectively at different timings; and setting delay times, with which acquisitions of the sensor information are delayed, for the plurality of wireless sensors respectively with reference to deviation of respective times at which the acquisition start instructions have been transmitted to the plurality of wireless sensors during transmitting the acquisition start instructions During transmitting the acquisition start instructions, the plurality of wireless sensors is caused to acquire common period sensor information respectively in the common period by further transmitting delay instructions for causing the acquisitions of the sensor information to be delayed to the plurality of wireless sensors in the delay times from respective times at which the acquisition start instructions are transmitted to the plurality of wireless sensors.

With the above configuration, it is possible to set the respective delay times with which the sensor information acquisition start times of the wireless sensors are synchronized merely by referring to the respective timings at which the sensor information acquisition start commands for starting the acquisition of the sensor information are transmitted to the plurality of wireless sensors. In this manner, it is possible to synchronize the plurality of sensor information transmitted in a time division manner. Also, it is not necessary to cut the sensor information that has not been synchronized, and it is possible to acquire the synchronized sensor information up to the upper limit of storage capacity using the wireless sensors. In addition, since it is not necessary to acquire useless sensor information that is not used, it is possible to suppress power consumption of the wireless sensors.

According to an aspect of the disclosure, a technology that enables synchronization of a plurality of sensor information for a technology in which a sensor management device communicates with a plurality of wireless sensors in a time division manner is provided.

The disclosure is not limited to the above embodiments, various modifications can be made within the scope indicated by the claims, and embodiments that are obtained by appropriately combining technical means disclosed in the different embodiments are also included within the technical scope of the disclosure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A sensor management device, receiving a plurality of sensor information from a plurality of wireless sensors that acquire the plurality of sensor information respectively by performing sampling for plural times at predetermined cycles in a common period, each wireless sensor of the plurality of wireless sensors including a sensor and a tag communication unit for wireless communication with the sensor management device, the sensor management device comprising:
a communication unit that respectively transmits an acquisition start instruction for starting acquisition of the plurality of sensor information to each wireless sensor of the plurality of wireless sensors at different timings via the corresponding tag communication unit, wherein each wireless sensor of the plurality of wireless sensors starts to acquire the sensor information using the corresponding sensor in response to receiving the corresponding acquisition start instruction from the communication unit, and then respectively transmits data collection instructions for instructing each wireless sensor of the plurality of wireless sensors to transmit the corresponding sensor information to the sensor management device; and an extraction unit that extracts a plurality of common period sensor information, which the plurality of wireless sensors has acquired in the common period for the plurality of wireless sensors, from the plurality of sensor information received by the communication unit using a time difference between the timings with at which the communication unit has respectively transmitted the acquisition start instructions to the plurality of wireless sensors, wherein the extraction unit cuts the plurality of sensor information based on the time difference to obtain the plurality of the common period sensor information.

2. The sensor management device according to claim 1, wherein the extraction unit extracts, from the plurality of sensor information, the plurality of common period sensor information that the plurality of wireless sensors has acquired respectively at or after a time that is the latest among respective times at which the transmission unit transmits the acquisition start instructions to the plurality of wireless sensors to determine the time difference between the timings of the plurality of wireless sensors to obtain the plurality of the common period sensor information.

3. The sensor management device according to claim 2, further comprising:

the communication unit that receives the plurality of sensor information respectively from the plurality of wireless sensors at different timings in response to receiving the data collection instructions at the plurality of wireless sensors, wherein the extraction unit extracts, from the plurality of sensor information, the plurality common period sensor information that the plurality of wireless sensors have acquired respectively at or before a time that is the earliest among respective times at which the communication unit starts to receive the plurality of sensor information from the plurality of wireless sensors.

4. A non-transitory computer readable recording medium, stored with a control program that causes a computer to function as the sensor management device according to claim 1, wherein the control program causes the computer to function as the communication unit and the extraction unit.

5. The sensor management device according to claim 1, wherein the acquisition start instructions are being transmitted to each of the plurality of wireless sensors in a sequence.

6. The sensor management device according to claim 1, wherein the extraction unit determines a cut off period according to an earliest timing of transmitting the acquisition start instruction and a latest timing of transmitting the acquisition start instruction among the timings at which the communication unit respectively transmits the acquisition start instructions to the plurality of wireless sensors, and the exaction unit extracts the common period sensor information by cutting the sensor information within the cut off period.

7. A sensor management device, receiving a plurality of sensor information from a plurality of wireless sensors that acquire the plurality of sensor information respectively by performing sampling for plural of times at predetermined cycles in a common period, each wireless sensor of the plurality of wireless sensors including a sensor and a tag communication unit for wireless communication with the sensor management device, the sensor management device comprising:

a communication unit that respectively transmits an acquisition start instruction with a corresponding delay time to each wireless sensor of the plurality of wireless sensors respectively at different timings via the corresponding tag communication unit, wherein each wireless sensor of the plurality of wireless sensors starts to acquire the corresponding sensor information using the corresponding sensor at or after receiving the corresponding acquisition start instruction from the communication unit based on the corresponding delay time; and a setting unit that sets the corresponding delay times of the plurality of wireless sensors, with which acquisitions of the plurality of sensor information are delayed, for the plurality of wireless sensors respectively based on a time difference between the timings at which the communication unit transmits the acquisition start instruction and the corresponding delay time to each wireless sensor of the plurality of wireless sensors, wherein the communication unit causes the plurality of wireless sensors to acquire common period sensor information respectively in the common period by further transmitting delay instructions for causing the acquisitions of the plurality of sensor information to be delayed to the plurality of wireless sensors in the corresponding delay times of the plurality of wireless sensors from the respective times at which the acquisition start instructions are transmitted to the plurality of wireless sensors.

8. A non-transitory computer readable recording medium, stored with a control program that causes a computer to function as the sensor management device according to claim 7, wherein the control program causes the computer to function as the communication unit and the setting unit.

9. A sensor information synchronization method, performed by a sensor management device that receives a plurality of sensor information from a plurality of wireless sensors that acquire the sensor information respectively by performing sampling for plural times at predetermined cycles in a common period, each wireless sensor of the plurality of wireless sensors including a sensor and a tag communication unit for wireless communication with the sensor management device, the method comprising:

respectively transmitting, by a communication unit of the sensor management device, an acquisition start instruction for starting acquisition of the sensor information to each of the plurality of wireless sensors at different timings using the corresponding tag communication unit, wherein each wireless sensor of the plurality of wireless sensors starts to acquire the sensor information using the corresponding sensor in response to receiving the corresponding acquisition start instruction from the communication unit; and then respectively transmitting, by the communication unit, a data collection instruction for instructing each wireless sensor of the plurality of wireless sensors to transmit the corresponding sensor information to the sensor management device using the corresponding tag communication unit; and extracting, by an extraction unit of the sensor management device, a plurality of common period sensor information that the plurality of wireless sensors has acquired in the common period for each wireless sensor of the plurality of wireless sensors, from the plurality of sensor information received by the communication unit by using a time difference between the timings at which the acquisition start instructions have been respectively transmitted to the plurality of wireless sensors, wherein the extraction unit cuts the plurality of sensor information based on the time difference to obtain the plurality of the common period sensor information.

10. A sensor information synchronization method, performed by a sensor management device that receives a plurality of sensor information from a plurality of wireless sensors that acquire the sensor information respectively by performing sampling for plurality of times at predetermined cycles in a common period, each wireless sensor of the plurality of wireless sensors including a sensor and a tag communication unit for wireless communication with the sensor management device, the method comprising:

respectively transmitting an acquisition start instruction, by a communication unit of the sensor management device, with a corresponding delay time to each wireless sensor of the plurality of wireless sensors for starting acquisition of the plurality of sensor information to each of the plurality of wireless sensors respectively at different timings via the corresponding tag communication unit, wherein each wireless sensor of the plurality of wireless sensors starts to acquire the corresponding sensor information using the corresponding sensor at or after receiving the corresponding acquisition start instruction from the communication unit based on the corresponding delay time; and setting the corresponding delay times, with which acquisitions of the plurality of sensor information are delayed, for the plurality of wireless sensors respectively based on a time difference between the timings at which the communication unit respectively transmits the acquisition start instruction and the corresponding delay time to each wireless sensor of the plurality of wireless sensors;

wherein during transmitting the acquisition start instructions, the plurality of wireless sensors are caused to acquire common period sensor information respectively in the common period by further transmitting delay instructions for causing the acquisitions of the plurality of sensor information to be delayed to the plurality of wireless sensors in the corresponding delay times of the plurality of wireless sensors from respective times at which the acquisition start instructions are transmitted to the plurality of wireless sensors.

* * * * *